United States Patent [19]

Izawa et al.

[11] 3,925,365
[45] Dec. 9, 1975

[54] METHOD FOR ISOLATING EPSILON-CAPROLACTAM MATERIAL

[75] Inventors: Nobuo Izawa; Toshihiko Kohno, both of Sakai, Japan

[73] Assignee: Kanebo, Limited, Tokyo, Japan

[22] Filed: Feb. 11, 1974

[21] Appl. No.: 441,061

[52] U.S. Cl. ............ 260/239.3 A; 260/78 SC; 431/7
[51] Int. Cl.² ................ C07D 201/12; C07D 201/16; C08G 64/14
[58] Field of Search......... 260/239.3 A, 78 S, 78 SC

[56] References Cited
UNITED STATES PATENTS
2,930,790    3/1960    Weise .......................... 260/239.3 A

*Primary Examiner*—Henry R. Jiles
*Assistant Examiner*—Robert T. Bond
*Attorney, Agent, or Firm*—Paul & Paul

[57] ABSTRACT

$\epsilon$-caprolactam material such as a monomer, oligomers and polymers of $\epsilon$-caprolactam and mixtures of these compounds are purified from impurity compounds such as phosphoric acid and ionized metal compounds contained therein by bringing the $\epsilon$-caprolactam material into contact with an aqueous solution containing 15 to 75 percent by weight of at least one alkali metal phosphate to extract the impurity compound from the $\epsilon$-caprolactam material into the phosphate aqueous solution and, thereafter, separating the $\epsilon$-caprolactam material from the phosphate aqueous solution by way of settling or centrifuging the mixture.

17 Claims, No Drawings

METHOD FOR ISOLATING EPSILON-CAPROLACTAM MATERIAL

The present invention relates to a method for purifying an ε-caprolactam material, more particularly, relates to a method for purifying ε-caprolactam compound from phosphoric acid, ionized metal compounds and mixtures of two or more of the above-mentioned compounds.

The term "ε-caprolactam material" used herein refers to any ε-caprolactam monomer, oligomers and polymers and mixtures of two or more of these compounds.

From the prior art, it is known that an ε-caprolactam monomer can be recovered by depolymerizing a waste material consisting of an ε-caprolactam polymer or oligomer or a mixture of the polymer and the oligomer in the presence of a catalyst consisting of phosphoric acid. Also, it is known that the ε-caprolactam monomer produced by the above method is better in quality than that produced by the method wherein the ε-caprolactam waste material is depolymerized in the presence of an alkali catalyst. However, in the depolymerization process using the phosphoric acid catalyst, if the ε-caprolactam material to be depolymerized contains metal ions, the metal ions cause deactivation of the phosphoric acid catalyst and deposition of a large quantity of metal salts in the depolymerization vessel. These behaviors result in interruption of the depolymerization reaction, decrease in the yield of the ε-caprolactam monomer and deterioration in quality of the ε-caprolactam monomer.

Generally, a crude ε-caprolactam monomer which has been prepared by a Beckmann rearrangement reaction from cyclohexanone oxime, or depolymerization of an ε-caprolactam raw material, polymer or oligomer, at a high temperature, is purified by distillation in the presence of a small amount of an alkali metal hydroxide or carbonate. Accordingly, the distillation residue from the above process contains concentrated alkali metal compound and, therefore, scrapping of the concentrated metal compounds accompanies scrapping of a large amount of the ε-caprolactam raw material. This results in a reduction in the yield of the purified ε-caprolactam monomer. Also, the scrapping of the large amount of the distillation residue by way of dumping, reclaiming or discharging with water, may result in environmental pollution. On the other hand, in burning the distillation residue, the concentrated metal compounds restrict the smooth combustion of the distillation residue. Further, the metal compounds corrode the combustion furnace for the distillation residue. Sometimes the destruction by fire of the distillation residue in the combustion furnace becomes practically impossible due to the influence of the concentrated metal compounds.

In the case where the ε-caprolactam waste material, oligomer or polymer, is depolymerized in the presence of the phosphoric acid catalyst while distilling out the resultant ε-caprolactam monomer the reaction residue from the above process contains concentrated phosphoric acid, a brown resinous substance which is a destruction product of the ε-caprolactam waste material, and a concentrated organic or inorganic substance which has been initially contained in the ε-caprolactam waste material. In order to smoothly burn up the reaction residue, it is necessary to remove the phosphoric acid and the metal phosphates which has been produced by reaction of phosphoric acid as the depolymerization catalyst with the metal compounds originally contained in the ε-caprolactam waste material. This is because the phosphoric acid and metal phosphates not only damage the combustion furnace but greatly obstruct the combustion of organic material. Also, sometimes, the reaction residue contains a large quantity of metal phosphates, especially, alkali metal phosphates, whereas the destruction product is in a small amount. In this case, such metal phosphates make it very difficult to proceed with the depolymerization.

This is because a large amount of the metal phosphates which are insoluble either in melted ε-caprolactam polymer or ε-caprolactam oligomer and, therefore, dispersed in the form of fine solid particles in the depolymerization system, causes an increase in the apparent viscosity of the depolymerization system. That is, the low fluidity of the depolymerization system results in difficulty in attaining a uniform reaction between the ε-caprolactam waste material, polymer or oligomer, and phosphoric acid and in unsmoothness in distilling out the resulting ε-caprolactam monomer. This further results in a low quality and yield of ε-caprolactam monomer being produced in the depolymerization system.

Because of the above circumstances, a method has been desired which would allow removing metal ions, especially, alakli metal ions, phosphoric acid and metal phosphates from an ε-caprolactam monomer, oligomer or polymer, at high efficiency.

Such a method should be capable of being applied to the ε-caprolactam material to be depolymerized, distilled or burnt up, or the reaction residue derived from a reaction process for recovering ε-caprolactam monomer, in order to smooth the depolymerization, distillation and destruction by fire of the ε-caprolactam material. However, no such method has previously been known.

The object of the present invention is to provide a method for purifying an ε-caprolactam compound from metal compounds and phosphoric acid in simple operation and at a high efficiency.

The other object of the present invention is to provide a method for purifying an ε-caprolactam compound from metal compounds and phosphoric acid, the isolated ε-caprolactam compound being suitable for depolymerization, distillation and combustion without difficulty.

The above objects can be accomplished by the method of the present invention comprising the steps of bringing an ε-caprolactam material selected from the group consisting of a monomer, oligomers and polymers of ε-caprolactam and mixtures of two or more of the above-mentioned compounds and containing at least one compound selected from the group consisting of phosphoric acid and ionized metal compounds, into contact with an aqueous solution containing 15 to 75 percent by weight of at least one alkali metal phosphate to extract said phosphoric acid and ionized metal compound from the ε-caprolactam material into the alkali metal phosphate aqueous solution, and separating said ε-caprolactam material phase from the alkali metal phosphate aqueous solution phase.

The term "metal compound" used herein refers to metal salts, metal hydroxide and other metal compounds existing in the ε-caprolactam material.

The term "alkali metal phosphates" used herein includes mono-alkali metal dihydrogen phosphates, dialkali metal monohydrogen phosphates, tri-alkali metal phosphates and mixtures of two or more of the above-mentioned phosphates.

The ε-caprolactam material to which the method of the present invention is applicable, may be selected from the group consisting of a. reaction residue containg an ε-caprolactam oligomer, monomer or a mixture thereof and alkali metal compounds, which has been obtained from the process wherein the ε-caprolactam polymer is washed with water, and the waste water-containing ε-caprolactam monomer, oligomer or mixture thereof is distilled in the presence of an alkali metal, hydroxide, carbonate, or hydride of alkali metal or mixture of two or more of the foregoing substances, b. distillation residues containing an ε-caprolactam monomer and alkali metal compounds, which has been obtained from a process wherein an ε-caprolactam monomer is polymerized in the presence of water as a catalyst, and a portion of the ε-caprolactam monomer is evaporated together with water and the ε-caprolactam monomer is distilled in the presence of an alkaline alkali metal compound.

c. reaction residues produced in processes for depolymerizing an ε-caprolactam polymer, oligomer or mixture of the polymer and oligomer in the presence of phosphoric acid as a catalyst, d. reaction residues containing alkali metal compounds produced in a distillation process for refining a crude ε-caprolactam monomer which has been produced by depolymerizing an ε-caprolactam polymer or oligomer or a mixture of the polymer and oligomer in the presence of phosphoric acid as a catalyst, e. distillation residues produced in processes wherein a crude ε-caprolactam monomer is produced by the Beckman rearrangement reaction of cyclohexanone oxime and the resultant crude ε-caprolactam is distilled in the presence of an alkaline alkali metal compound, f. reaction residues produced in processes for depolymerizing an ε-caprolactam polymer or oligomer or a mixture of the polymer and oligomer in the presence of an alkali metal compound as catalyst, g. an ε-caprolactam polymer, oligomer or mixtures of the polymer and oligomer which has been prepared by polymerizing an ε-caprolactam monomer in the presence of a catalyst consisting of at least one substance selected from the group consisting of alkali metals, alkali metal hydroxides, alkali metal carbonates and alkali metal hydrides;

h. mixtures of two or more of the ε-caprolactam materials as stated above.

The above-mentioned distillation residues (a), (b), (d), and (e) sometimes, contain manganese compounds derived from potassium permanganate, with which the ε-caprolactam monomer has been refined before the distillation.

The above-mentioned ε-caprolactam materials may be admixed with each other.

The ε-caprolactam material to which the method of the present invention is applicable, generally contains 0.1 to 20 percent by weight of alkali metal ions calculated in terms of an alkali metal hydroxide. However, the method of the present invention is applicable and has high efficiency even for the ε-caprolactam material containing about 0.01 percent by weight of metal ions, especially, alkali metal ions, calculated in term of a metal hydroxide.

In the case where an ε-caprolactam polymer or oligomer is depolymerized and the resultant ε-caprolactam monomer is recovered by way of distillation, the depolymerization reaction residue, to which the method of the present invention is applicable, contains phosphoric acid which has been utilized as a depolymerization catalyst, netal phosphates which have been produced by reaction of the phosphoric acid with metal ion, especially, alkali metal ion, originally contained in the ε-caprolactam polymer or oligomer, or which have been contained in the ε-caprolactam polymer or oligomer as a component of polymerization catalyst, or mixtures of the phosphoric acid and the metal phosphates.

The contents of the impurities, of course, depends on the amount of the phosphoric acid used in the depolymerization, the amount of the metal ions initially contained in the ε-caprolactam polymer and type of the depolymerization process, that is, continuous or batchwise depolymerizations. In the case where batchwise depolymerizations are repeated, sometimes the final reaction residue contains about 80 percent phosphoric acid. Compared with this, in the case of continuous depolymerization, sometimes the reaction residue contains about 1 percent phosphoric acid. The method of the present invention can be applied to either the reaction residue containing a very large amount of phosphoric acid or the reaction residue containing a very small amount of phosphoric acid.

The ε-caprolactam material usable for the method of the present invention may contain impurities other than the phosphoric acid and alkali metal compound, for example, titanium dioxide pigment, carbon black manganese pyrophosphate used as a light proofing agent, anti-flaming agent containing copper salt or bromine compound, high boiling point compounds such as oiling agents, and basic compounds, resinous substances and carbonized substance which have been produced during high temperature polymerization or depolymerization. The total content of these impurities in the ε-caprolactam material to be treated by the method of the present invention depends on the history of the material, for example, type and quality of the ε-caprolactam polymer or oligomer used in depolymerization and type of the depolymerization and distillation, and depolymerization conditions. Generally, this total content is about 20 percent or less.

The alkali metal phosphate aqueous solution usable for the method of the present invention contains 15 to 75 percent, preferably, 20 to 70 percent, more preferably, 30 to 60 percent by weight of the alkali metal phosphates. If the concentration of the alkali metal phosphate aqueous solution is lower than 15 percent by weight, the ε-caprolactam monomer, ε-aminocaproic acid which is a ring-cleaven hydrated product of an ε-caprolactam monomer, and water soluble organic impurities undesirably tend to move from the ε-caprolactam material phase into the phosphate aqueous solution phase and the phosphate aqueous solution phase has a low separating property from the ε-caprolactam material phase. Further, in this case, the metal ions and phosphoric acid are incompletely extracted from the ε-caprolactam material phase into the phosphate aqueous solution. If the phosphate aqueous solution has a concentration higher than 75 percent by weight, the separating property of the phosphate aqueous solution phase from the ε-caprolactam material phase is unsatisfactory. This results in insufficient extraction of the metal ions and phosphoric acid.

The process of the present invention is basically premised on the grounds that the ε-caprolactam monomer, oligomer and polymer are incompatible with the concentrated alkali metal phosphate aqueous solution and that the ionized metal compounds, especially, the ionized alkali metal compounds and phosphoric acid are distributed in the alkali metal phosphate aqueous solution at a very higher distribution coefficient than in the ε-caprolactam monomer, oligomer and polymer.

The alkali metal phosphates usable for the method of the present invention may be lithium, sodium or potassium phosphates or mixtures of two or more of the above-mentioned phosphates.

The phosphate aqueous solution usable for the method of the present invention may be prepared by dissolving, in water, the mono-alkali metal dihydrogen phosphates, di-alkali metal monohydrogen phosphates, tri-alkali metal phosphates, alkali metal polyphosphate mixtures of the above phosphates, or mixtures of phosphoric acid or polyphosphoric acids and alkali metal hydroxides, alkali metal carbonates. This phosphate aqueous solution may be in a pH range from 4.0 to 12.5. The tri-alkali metal phosphate aqueous solution is more highly alkaline and, therefore, suitable for extracting phosphoric acid and acid salts rather than alkaline salts from the ε-caprolactam material.

Sometimes the phosphate aqueous solution contains a single phosphate but, sometimes, it contains a mixture of two types or more of phosphates. In a preferable aspect, mixtures of a monoalkali metal dihydrogen phosphate and a di-alkali metal monohydrogen phosphate are dissolved in water at a pH from 5 to 9. This aqueous solution is approximately neutral and, therefore, has no tendency to give alkaline substance or acid substances to the ε-caprolactam material. Further, this aqueous solution has very little tendency to give neutral salts to the ε-caprolactam material. If an acid or alkaline substance is moved from the phosphate aqueous solution phase into the ε-caprolactam material phase, the isolated ε-caprolactam material has difficulty in combustion distillation and depolymerization. The acid or alkaline substance causes damage to the combustion furnace and obstruction of the combustion of the ε-caprolactam material.

The contact of the ε-caprolactam material with the phosphate aqueous solution is carried out at a temperature of, preferably, 60° to 300°C, more preferably, 100° to 250°C. Even if the contact is effected at a temperature above 300°C, the extraction effect is not enhanced. Further, such high temperature extraction undesirably requires an apparatus resistant to very high pressure. If the extraction temperature is lower than 60°C, the ε-caprolactam material is in solid phase. This is disadvantageous for completing the extraction within a short time. Accordingly, it is more preferable to effect the extraction at a temperature of 100° to 250°C under a small positive pressure of 1 to 40 kg/cm².

The ratio of the weight of the ε-caprolactam material to the weight of the phosphate aqueous solution is preferably in a range from 1 : 10 to 2 : 1. The mixture of the ε-caprolactam material and the phosphate aqueous solution is preferably stirred from a few minutes to ten minutes. The stirring time is adjustable in response to the form of the ε-caprolactam material, extraction temperature, type of apparatus for the extraction and type of stirrer. Generally, the stirring time is shorter than 2 hours. The extraction may be carried out in any type operation, batchwise or continuous, and in any conventional apparatus. For example, a settler with a stirrer is usable for the extraction. A conventional centrifugal separator is useful for completely purifying the ε-caprolactam material phase from the phosphate aqueous solution phase.

The phosphate aqueous solution may be repeatedly or continuously used to extract the phosphoric acid and metal compounds. In this case, the concentration of the phosphate aqueous solution varies with the repeating number of the extraction. Accordingly, if desired, the concentration is adjusted by adding water, phosphoric acid, alkali metal hydroxide, alkali metal carbonate or alkali metal phosphate into the extraction system.

If it is necessary, before the extraction operation, any of the above-mentioned compounds and water may be added in an amount calculated from the concentrations and compositions of the used alkali metal phosphate aqueous solution which will be extracted after the extraction operation is completed, into the extraction system.

In the event that some water-insoluble and chemically stable substance, such as titanium dioxide pigment and carbon black, in the ε-caprolactam material, is moved into the phosphate aqueous solution during the extraction, the substance can be removed by a suitable operation, for example, filtration and decantation.

The alkali metal phsophate extracted into the phosphate aqueous solution may be recovered from the aqueous solution to utilize in various fields. For example, the recovered phosphates can be converted to sodium tripolyphosphate usable as a detergent builder or to tetrasodium pyrophosphate usable for cleaning waste water or as a boiler compound.

The purified ε-caprolactam material contains a small amount of water and a negligible amount of metal ions, phosphoric acid or both the above substances. However, these small amount of impurities do not interfere with depolymerization, distillation and combustion of the ε-caprolactam material.

In order to depolymerize the purified ε-caprolactam material free from metal ion, a suitable amount of phosphoric acid or a reaction residue containing phosphoric acid is mixed into the purified ε-caprolactam material, and the mixture is heated at a temperature of 200° to 320°C under an absolute pressure of 0.1 to 3 atmosphere. The phosphoric acid is preferably in a concentration of 0.5 to 30 percent by weight. A portion (not larger than 20 percent by mole) of the phosphoric acid to be added to the depolymerization system may be substituted by monosodium dihydrogen phosphate. The ε-caprolactam material to be depolymerized may be fed into a depolymerization reactor batchwise or continuously. If it is necessary, the ε-caprolactam material may be preheated to remove water therein, and, thereafter, heated to the desired depolymerization temperature. The depolymerization reaction may be promoted by blowing superheated steam into the depolymerization system. The depolymerization may be carried out without blowing of the superheated steam under a reduced pressure of 1 to 50 mmHg. However, in this case, the resultant ε-caprolactam monomer has a relatively low quality.

The depolymerization of the ε-caprolactam material purified in accordance with the method of the present invention can be very smoothly carried out as it contains no or a negligible amount of metal compound and, therefore, the reaction mixture has a high fluidity. After the depolymerization is completed, it is observed that no or a negligible amount of adhesive substance stains the inside wall surfaces of reactor or pipes. Therefore, the depolymerization can be continued over a very long time period with a high efficiency and the resultant ε-caprolactam is of an excellent quality.

The ε-caprolactam monomer purified by the method of the present invention may be subjected to distillation in the conventional methods. If it is necessary, the purified ε-caprolactam monomer is further purified with activated carbon, ion exchange resin, permanganates, bichromates or alkali compounds, before the distillation. The purified ε-caprolactam monomer may be distilled alone or mixed with a fresh ε-caprolactam monomer and then, distilled together. The distillation may be effected batchwise or continuously at a temperature of 120° to 200°C under a pressure of 5 to 10 mmHg, using a conventional distillator such as multistage distillation tower having perforated plates which is of low pressure loss, thin film type distillator or single distillator. The ε-caprolactam monomer may be preheated before the distillation to remove low boiling point substances such as water.

In the case where the purified ε-caprolactam material contains a noticeable amount of lowly volatile substances such as ε-aminocaproic acid and ε-caprolactam oligomer, it is advantageous that the ε-caprolactam material be mixed with an ε-caprolactam polymer material, such as waste poly-ε-caprolactam, to be depolymerized, The depolymerization is, of course, carried out by the conventional method for the ε-caprolactam polymer or oligomer.

If the isolated ε-caprolactam material derived from the reaction residue of the depolymerization reaction process merely contains no or a negligible amount of impurities other than phosphoric acid and alkali metal phosphate, it is desirable to recycle the purified ε-caprolactam material to the depolymerization reactor. This is effective for enhancing the yield of the ε-caprolactam monomer.

For the purpose of burning up the purified ε-caprolactam material, it is sent to a combustion furnace in the melt state or after solidifying. In order to prevent imperfect combustion and generation of nitrogen oxides, the combustion is carried out generally at a temperature of 500° to 900°C. As the phosphoric acid and alkali metal compounds which tends to damage the combustion furnace and obstruct the combustion of organic substances is removed, all of conventional combustion furnaces for conventional synthetic plastics can be utilized for burning up the isolated ε-caprolactam material. The combustion furnace may be selected from fixed combustion bed type, converter type, spray combustion type, vortex combustion type and fluidized combustion bed type furnaces. The purified ε-caprolactam material may be mixed with a combustible material and burnt up together therewith.

In a preferable embodiment of the method of the present invention, an alkali metal phosphate aqueous solution is brought into contact with an ε-caprolactam polymer or oligomer containing alkalis or alkaline salts to be sent to a depolymerization process, or an ε-caprolactam monomer containing alkali metal ions to be recycled to a distillation process or depolymerization process or to be sent to destruction by fire, to remove the alkalis and alkaline salts and, then, brought once again into contact with ε-caprolactam material containing phosphoric acid or acid salts of alkali metals to eliminate the phosphoric acid and the acid salts. Of course, the above operation may be carried out in the reverse order to the above. That is, an alkali metal phosphate aqueous solution is utilized twice or more for separately extracting alkali and alkaline salts and phosphoric acid and acid salts in alternate operations.

The ε-caprolactam material containing alkaline salts or alkalis may be preliminarily blended with the ε-caprolactam material containing phosphoric acid or acid salts. In this case, the extraction is carried out in one operation. This is effective not only for minimizing consumption of the phosphoric acid and alkali metal phosphates but for economizing equipment cost and operational cost.

As detailed above, the method of the present invention is effective for removing metal compounds, particularly, alkali metal compounds, and phosphoric acid from the ε-caprolactam material by simple and easy operations. This removal is effective for smoothing the depolymerization, distillation and combustion of the ε-caprolactam material and enhancing the quality and yield of the recoverd ε-caprolactam monomer. Further, the method of the present invention can be carried out either batchwise or continuously to recover and utilize the waste ε-caprolactam material without loss in quantity of the ε-caprolactam material and creation of environmental pollution.

The following examples are intended to illustrate the method of the present invention but are not intended to limited the scope thereof. In these examples, parts and percentages are by weight unless otherwise indicated, and the contents of ionized metal compounds and phosphoric acid in the ε-caprolactam material were determined by the method wherein the ε-caprolactam material was ashed and then, the ash was dissolved in hot water, a diluted hydrochloric acid aqueous solution or a diluted sodium hydroxide aqueous solution and the solution was titrated, or the ash was dissolved in nitric acid and the solution was subjected to an atomic light absorption analysis. Or, some alkali metal ions were titrated in such a manner that the sample to be analized was directly dissolved or suspended in water and the aquous solution or suspension was titrated with a 0.1 N hydrochloric acid aqueous solution.

The term "PM value" used in the examples is an index of the quality of the purified ε-caprolactam monomer, and was determined in such a manner that 1 g of ε-caprolactam was dissolved in 100 ml of distilled water, into the solution was mixed 1 ml of an aqueous solution containing 0.01 mole of potassium permanganate, and the time in seconds required to change the color of the above mixture solution to a standard solution (which is an aqueous solution of 3 g of $CoCl_2.6H_2O$ and 2 g of $CuSO_4.5H_2O$ in 1 litre of water) was measured.

The "acid value" of the ε-caprolactam monomer used in the examples was determined in such a manner that 5 g of ε-caprolactam monomer were dissolved in 50 ml of water, the aqueous solution was titrated with 0.01 N sodium hydroxide aqueous solution in the presence of phenolphthalein, and from the titration value, the concentration in percent of acids was calculated in terms of acetic acid.

Unless otherwise indicated, the burning up of the ε-caprolactam material was carried out using a fluidized bed type combustion furnace for laboratory work. The bed material was composed of silica sand of 60 to 120 mesh size containing 98 percent or more silica. The bed material was fluidized by blown air having a velocity of about ten times the minimum fluidization velocity. During the combustion, the combustion furnace was maintained at a temperature of about 800°C by spraying water thereinto and adjusting the temperature of the air blown thereinto.

The combustion test was continued for 48 hours unless difficulty was observed, to burn up the ε-caprolactam material in a weight of about twice the weight of the bed material.

EXAMPLE 1

A poly-ε-caprolactam was prepared by polymerizing ε-caprolactam, and a mixture of non-reacted ε-caprolactam and ε-caprolactam oligomer were recovered by way of extraction. Further, the non-reacted ε-caprolactam monomer was recovered from the mixture by way of distillation. 5 kg of the distillation residue which contained 60 percent of ε-caprolactam oligomer and 14 percent of alkali in term of NaOH, was heated to a temperature to prepare a homogenous solution and then, uniformly mixed with 6 kg of an aqueous solution of 90°C containing 42 percent of monosodium dihydrogen phosphate ($NaH_2PO_4$) and having a pH of 4.0 by stirring for 2 minutes using a stirrer. The mixture was settled within a separating funnel heated at a temperature of 90°C for 10 minutes, and the ε-caprolactam oligomer phase was separated from the phosphate aqueous solution phase.

As a result of chemical analysis, the ε-caprolactam oligomer phase contained no free alkali, 0.3 percent of sodium dihydrogen phosphate and 0.2 percent of phosphoric acid.

COMPARISON EXAMPLE 1

5 kg of the same residue from the ε-caprolactam monomer distillation as in Example 1 was mixed with 10 kg of an aqueous solution of 90°C containing 23 percent of sodium sulfate and the mixture was vigorously shaken. The mixture was settled in a warm separating funnel to separate the ε-caprolactam oligomer phase from the sodium sulfate aqueous solution phase. As a result of chemical analysis, the ε-caprolactam oligomer phase contained 0.15 percent of free alkali. For further comparison, the same procedures as in Comparison Example 1 were repeated using water instead of the sodium sulfate aqueous solution. The ε-caprolactam oligomer was uniformly dissolved in water. Therefore, it failed to separate the ε-caprolactam oligomer phase from the water phase.

For the other comparison, the same procedures as in Comparison Example 1 were repeated using an aqueous solution containing 10 percent of phosphoric acid instead of the sodium sulfate aqueous solution. The ε-caprolactam oligomer was uniformly dissolved in the phosphoric acid aqueous solution. Accordingly, it was impossible to recover the ε-caprolactam oligomer from the phosphoric acid aqueous solution.

EXAMPLE 2

5 kg of a molten mixture of 1 part by weight of ε-caprolactam monomer, of 4 parts of ε-caprolactam oligomer, containing 6.5 percent of an alkali based on the weight of the mixture, were mixed with 1.4 kg of an aqueous solution containing 55 percent of phosphoric acid. The mixture was further mixed with 10 kg of an aqueous solution of 100°C containing 27 percent of sodium dihydrogen phosphate. The mixture was shaken for 3 minutes to extract the alkali metal ions and phosphoric acid into the phosphate aqueous solution, and thereafter, settled in a hot separating funnel. About 15 minutes later, the ε-caprolactam monomer and oligomer phase was completely separated from the phosphate aqueous solution phase.

Further, the same extraction operation as stated above was successively repeated 9 times using, instead of the fresh phosphate aqueous solution, a mixture solution of 1.4 kg of an aqueous solution containing 57 percent of phosphoric acid with the foregoing phosphate aqueous solution separated from the ε-caprolactam monomer and oligomer phase in the foregoing operation. In each of these repeated opeations 5 kg of the same molten mixture of the ε-caprolactam monomer and oligomer as that first used, was used. The concentrations of the sodium dihydrogen phosphate in the aqueous solution were determined both before and after each extraction operation.

Further, the concentrations of sodium dihydrogen phosphate and phosphoric acid in the isolated ε-caprolactam monomer and oligomer phase were determined. The results are shown in Table 1.

Table 1

| Extraction No. | Concentration of $NaH_2PO_4$ in aqueous solution (%) | | Concentration in purified ε-caprolactam monomer and oligomer phase (%) | |
|---|---|---|---|---|
| | Before extraction | After extraction | $NaH_2PO_4$ | $H_3PO_4$ |
| 1 | 27 | 34.7 | 0.42 | 0.4 |
| 2 | 34.7 | 38.5 | 0.41 | 0.3 |
| 3 | 38.5 | 43.9 | 0.35 | 0.2 |
| 4 | 43.9 | 48.9 | 0.20 | 0.1 |
| 5 | 48.9 | 51.8 | 0.21 | 0.05 |
| 6 | 51.8 | 54.9 | 0.02 | 0.05 |
| 7 | 54.9 | 56.1 | 0.02 | 0.05 |
| 8 | 56.1 | 58.9 | 0.01 | 0.1 |
| 9 | 58.9 | 62.4 | 0.01 | 0.15 |
| 10 | 62.4 | 66.0 | 0.15 | 0.3 |

From Table 1, it is obvious that the sodium dihydrogen phosphate aqueous solution can be repeatedly utilized to extract the alkali metal ions and phosphoric acid from the ε-caprolactam material phase.

COMPARISON EXAMPLE 2

5 kg of the same mixture of ε-caprolactam monomer and oligomer as in Example 2 were mixed into 1 kg of an aqueous solution of 78 percent of sodium dihydrogen phosphate having a pH of 4.0, and the extraction mixture was shaken for 3 minutes while being maintained at a temperature of 100°C or higher. The mixture was settled in a hot separating funnel. In order to completely separate the ε-caprolactam monomer and oligomer phase from the phosphate aqueous solution phase, about 90 minutes were consumed. This is about six times the separation time of Example 2. The isolated ε-caprolactam monomer and oligomer phase contained 2.35 percent of sodium dihydrogen phosphate.

COMPARISON EXAMPLE 3

5 kg of the same mixture of ε-caprolactam monomer and oligomer as used in Example 2 were mixed into 10 kg of an aqueous solution of 10% of sodium dihydrogen phosphate and the mixture was shaken for 3 minutes at a temperature of 85°C or higher. The mixture was settled in a hot separating funnel for 15 minutes. The separated ε-caprolactam monomer and oligomer phase contained no alkali metal ion. However, the separated phosphate aqueous solution contained 250 g of ε- caprolactam monomer which corresponds to one quarter the original amount of ϵ-caprolactam monomer. This amount of the ϵ-caprolactam monomer in the phosphate aqueous solution was determined by concentrating the aqueous solution to deposit the ϵ-caprolactam monomer from the aqueous solution and separating the deposited ϵ-caprolactam monomer.

EXAMPLES 3 THROUGH 7 AND COMPARISON EXAMPLE 4

An ϵ-caprolactam monomer aqueous solution which had been prepared by condensing vapors of ϵ-caprolactam monomer and water distilled from a system for polymerizing ϵ-caprolactam in the presence of water as a catalyst, was mixed with an aqueous solution of ϵ-caprolactam monomer and oligomer which had been obtained from washing, with water, poly-ϵ-caprolactam produced in the above-mentioned polymerization system. The mixture was distilled in the presence of sodium hydroxide to recover ϵ-caprolactam monomer. The distillation residue was collected, and consisted of 25 percent of ϵ-caprolactam monomer, 2.0 percent of alkali metal ion calculated in terms of sodium hydroxide and the balance mainly consisting of ϵ-caprolactam oligomer.

In Example 3, the above distillation residue was mixed with an aqueous solution containing sodium dihydrogen phosphate and having a pH of 4.0 in an amount of 1.5 times the distillation residue and the mixture was charged into a settler with a stirrer. The mixture was agitated in the settler by the stirrer at a temperature of 100°C for 20 minutes, and, thereafter, settled for 30 minutes to separate the ϵ-caprolactam monomer and oligomer phase from the phosphate aqueous solution phase.

The purified ϵ-caprolactam monomer and oligomer phase contained alkali metal phosphates and phosphoric acid in amounts shown in Table 2. The ϵ-caprolactam monomer and oligomer mixture was mixed with 4 percent of phosphoric acid based on the weight of the ϵ-caprolactam mixture and then, subjected to a batchwise depolymerization process for ϵ-caprolactam oligomer. The depolymerization was carried out while blowing superheated steam into the reaction system under a normal pressure. The reaction ratio was attained to about 80 percent.

The term "reaction ratio" used here refers to a ratio of the weight of the ϵ-caprolactam monomer produced to the original weight of the ϵ-caprolactam mixture.

After the depolymerization and distillation was finished, the reaction residue in an amount of 20 percent of the original charge was mixed with the fresh ϵ-caprolactam monomer and oligomer mixture in an amount four times the reaction residue. The mixture was subjected to the same depolymerization and distillation process as stated above. These operations were successively repeated a further three times. That is, the depolymerization were successively carried out 5 times batchwisely.

The ϵ-caprolactam monomer recovered in the five batches were collected and purified by flowing them through a packed tower-type distillater of 6 theoretical stages. The purified ϵ-caprolactam monomer had a PM value of 3,600 seconds or more and an acid value of 0.002 or less, and was suitable for producing poly-ϵ-caprolactam usable for fiber making. The yield of the purified ϵ-caprolactam was 87 percent.

In Example 4, the same procedures as in Example 3 were repeated using an aqueous solution of 40 percent of disodium hydrogen phosphate at a pH of 9.5 instead of the sodium dihydrogen phosphate aqueous solution.

In Example 5, the same procedures as in Example 3 were repeated using an aqueous solution containing 40 percent of a mixture of sodium dihydrogen phosphate and disodium hydrogen phosphate in a mole ratio of 1 : 1 at a pH of 7.3.

In Example 6, the same procedures as above were repeated using an aqueous solution containing 40 percent of dipotassium hydrogen phosphate at a pH of 9.6.

In Example 7, the same procedures as above were repeated using an aqueous solution containing 30 percent of lithium dihydrogen phosphate at a pH of 4.0.

In Comparison Example 4, the same procedures as in Example 3 were repeated except that the ϵ-caprolactam mixture was not treated with the phosphate aqueous solution. The contents of phosphates and phosphoric acid in the ϵ-caprolactam phase isolated from the phosphate aqueous solution are shown in Table 2. The depolymerizations in Example 4 through 7 were all effected without difficulty. However, in Comparison Example 4, in second and third batches, the depolymerization was operationally difficult due to the high viscosity of the charged material. In fourth batch the reaction residue could not be subjected to depolymerization because of its high viscosity.

Table 2

| Example No. | Phosphate aqueous solution | | Contents of phosphates and phosphoric acid in ϵ-caprolactam mixture (%) | | | Yield of purified ϵ-caprolactam (%) |
| --- | --- | --- | --- | --- | --- | --- |
| | Type of phosphate | Concentration (%) | MH$_2$PO$_4$*1 | M$_2$HPO$_4$*2 | H$_3$P$_4$ | |
| 3 | NaH$_2$PO$_4$ | 50 | 0.15 | — | 0.15 | 87 |
| 4 | Na$_2$HPO$_4$ | 40 | 0 | 0.30 | 0 | 84 |
| 5 | NaH$_2$PO$_4$ and Na$_2$HPO$_4$(1:1) | 40 | 0.10 | 0.10 | 0 | 90 |
| 6 | K$_2$HPO$_4$ | 40 | 0 | 0.35 | 0 | 83 |
| 7 | LiH$_2$PO$_4$ | 30 | 0.15 | 0 | 0.20 | 85 |
| Comparison Example 4 | non | — | — | — | — | 65*3 |

Note:
*1MH$_2$PO$_4$:monoalkali metal dihydrogen phosphate
*2M$_2$HPO$_4$:dialkali metal hydrogen phosphate
*3:total yield of batches 1, 2 and 3

EXAMPLES 8 THROUGH 10 AND COMPARISON EXAMPLES 5 AND 6

In example 8, the same operations as in Example 3 were applied to the same ϵ-caprolactam monomer and oligomer mixture as in Example 3 except that the phosphate aqueous solution contained 50 percent of a mixture of 7 parts by mole of sodium dihydrogen phosphate and 3 parts by mole of disodium hydrogen phosphate and had a pH of 5.5, and the extraction was carried out at a temperature of 170°C under a gauge pressure of about 6 kg/cm².

In Example 9, the same procedures as in Example 8 were repeated using an aqueous solution of 45 percent of a mixture of 4 parts by mole of sodium dihydrogen and 6 parts by mole of disodium hydrogen phosphate at a pH of 7.4.

In Example 10, the same procedures as in Example 8 were repeated using an aqueous solution of 40 percent disodium hydrogen phosphate at a pH of 9.5.

The contents of phosphates in the isolated ε-caprolactam monomer oligomer mixture are shown in Table 3. In Examples 8 through 10, the depolymerization was smoothly carried out without difficulty.

Table 3

| Example No. | Content of phosphates in purified ε-caprolactam phase (%) | |
|---|---|---|
| | MH$_2$PO$_4$ | M$_2$HPO$_4$ |
| 8 | 0.10 | 0.04 |
| 9 | 0.06 | 0.08 |
| 10 | 0 | 0.20 |

In Comparison Example 5, the same operations as in Example 8 were repeated using an aqueous solution containing 30 percent of sodium chloride at a pH of 6.7. The purified ε-caprolactam mixture phase contained 0.2 percent of sodium chloride and 0.65 percent of sodium ion in the term of sodium hydroxide. In fourth batch of the depolymerization, the fluidity of the charge lowered undesirably.

In Comparison Example 6, the same procedures as in Example 8 were repeated using an aqueous solution of a pH of 6.5 containinig 20 percent of sodium sulfate. The purified ε-caprolactam phase contained 0.30 percent of sodium sulfate and 0.4 percent of sodium ions calculated in terms of sodium hydroxide. In this comparison example, the charge in the fourth bath was undesirably highly viscous, and the recovered ε-caprolactam monomer smelled like sulphur.

EXAMPLES 11 THROUGH 15 AND omparison EXAMPLES 7 AND 8

In Example 11, the same operations as in Example 3 were applied to a mixture of 80 percent of the same sodium ion-containing ε-caprolactam monomer and oligomer mixture as in Example 3 and 20 percent of a crude ε-caprolactam monomer. The extraction was carried out at a temperature of 80°C by using an aqueous solution of a pH of 5.1 containing 20 percent of a mixture of 8 parts by mole of sodium dihydrogen phosphate and 2 parts by mole of disodium hydrogen phosphate in an amount by weight of 0.7 times the ε-caprolactam mixture.

Examples 12, 13, 14 and 15 respectively used the phosphate aqueous solution in concentrations of 30, 40, 60 and 70 percent. The contents of the phosphates in the ε-caprolactam mixture isolated from the phosphate aqueous solution in Examples 11 through 15 are shown in Table 4. In these examples, the depolymerization process in every batch was smoothly carried out without difficulty.

In Comparison Example 7, the same procedures as in Example 11 were repeated using an aqueous solution containing 12 percent of the same phosphate mixture as in Example 11 and having a pH of 5.2. In this comparison example, the depolymerization in fifth batch could not be carried out because of very low fluidity of the charge. Further, it was observed that in the extraction process, a portion of the ε-caprolactam monomer in the ε-caprolactam mixture was dissolved out in an amount of about 20 percent based on the original amount thereof into the phosphate aqueous solution.

In Comparison Example 8, the same operations as in Example 11 were repeated using an aqueous solution containing 80 percent of the same phosphate aqueous solution in Example 11 and having a pH of 5.1. In this comparison example, the depolymerization in fifth batch was difficult because of very low fluidity of the charge. The contents of the phosphates in the isolated ε-caprolactam mixtures in Examples 11 through 15 and Comparison Examples 7 and 8 are shown in Table 4.

Table 4

| Example and Comparison Example No. | Concentration of phosphate (%) | Content of phosphates in purified ε-caprolactam mixture (%) | |
|---|---|---|---|
| | | NaH$_2$PO$_4$ | Na$_2$HPO$_4$ |
| Comparison Example 7 | 12 | 0.90 | 1.10 |
| 11 | 20 | 0.40 | 0.10 |
| 12 | 30 | 0.28 | 0.08 |
| 13 | 40 | 0.25 | 0.06 |
| 14 | 60 | 0.30 | 0.07 |
| 15 | 70 | 0.40 | 0.10 |
| Comparison Example 8 | 80 | 1.50 | 0.25 |

EXAMPLES 16 THROUGH 18 AND COMPARISON EXAMPLE 9

A waste material from a shaping process of a poly-ε-caprolactam which had been made by polymerizing ε-caprolactam in the presence of sodium hydroxide as a catalyst, contained 0.5 percent of sodium ion calculated in terms of sodium hydroxide. In Example 16, the waste material was finely divided to an average size of 10 mesh and mixed, at a temperature of 70°C, with an aqueous solution of a pH of 7.3 containing 55 percent of a mixture of 1 part by mole of sodium dihydrogen phosphate and 1 part by mole of disodium hydrogen phosphate. The mixture was stirred and settled for 2 hours to extract the sodium ion from the poly-ε-caprolactam waste. Therefore, the poly-ε-caprolactam was purified from the phosphate aqueous solution. The concentrations of the phosphates in the purified poly-ε-caprolactam were determined and, then, the poly-ε-caprolactam was burnt in a combustion furnace. The combustion was smoothly carried out without difficulty.

In Example 17, the same operations as in Example 16 were repeated except that the waste poly-ε-caprolactam was melted and, then, brought into contact with the same phosphate aqueous solution as in Example 16 at a temperature of 250°C.

In Example 18, the same procedures as in Example 16 were repeated except that the waste poly-ε-caprolactam was mixed with a crude ε-caprolactam monomer in an amount equal to that of the waste poly-ε-caprolactam, and the mixture was melted, uniformly mixed and, then, brought into contact with the same phosphate aqueous solution in Example 11 at a temperature of 190°C.

In Examples 17 and 18, the combustion of the isolated waste poly-ε-caprolactam was smoothly carried out without blocking of the combustion bed material.

In Comparison Example 9, the waste poly-ε-caprolactam was, without removal of the sodium ion therefrom, burnt in the same combustion furnace. After the combustion was continued for 20 hours, it was observed that the combustion bed material was blocked.

The contents of the phosphates in the isolated ε-caprolactam mixtures in Examples 16 through 18 and Comparison Example 9 are shown in Table 5.

Table 5

| Example No. | Extraction Temperature (°C) | Time (hour) | Content of phosphates in purified ε-caprolactam mixture (%) | |
|---|---|---|---|---|
| | | | $NaH_2PO_4$ | $Na_2HPO_4$ |
| 16 | 70 | 2 | 0.10 | 0.03 |
| 17 | 250 | 1 | 0.08 | 0.04 |
| 18 | 190 | 1 | 0.10 | 0.05 |
| Comparison Example 9 | — | — | — | 0.50 in the term of NaOH |

EXAMPLES 19 THROUGH 23 AND COMPARISON EXAMPLE 10

In Example 19, a mixture of ε-caprolactam polymer and oligomer was depolymerized in the presence of phosphoric acid catalyst to prepare a crude ε-caprolactam monomer. An aqueous solution of 30 percent of the crude ε-caprolactam monomer was mixed with 1 percent of sodium permanganate based on the weight of the ε-caprolactam monomer. The mixture was heated at a temperature of about 50°C to deposit manganese dioxide. The crude ε-caprolactam solution was separated from the manganese dioxide by filteration and concentrated. The concentrated crude ε-caprolactam solution was mixed with 1 percent of sodium hydroxide and, then, subjected to the first distillation to recover ε-caprolactam. The distillation residue contained 7 percent of ε-caprolactam oligomer, 8 percent of ε-aminocaproic acid, 15 percent of alkali metal ion (sodium and potassium ions) calculated in terms of sodium hydroxide, 110 p.p.m. of manganese and the balance mainly consisting of ε-caprolactam monomer.

One part of the distillation residue obtained above was mixed with 3 parts of an aqueous solution containing 50 percent of sodium dihydrogen phosphate in a settler with a stirrer. The mixture was agitated at a temperature of 100°C for 10 minutes to remove alkali metal ions and manganese from the distillation residue, and thereafter, settled for 30 minutes to separate the ε-caprolactam mixture from the phosphate aqueous solution. The purified ε-caprolactam mixture was further mixed with a fresh crude ε-caprolactam monomer the same as used above and a fraction of the distilled ε-caprolactam monomer which had been distilled in the first distillation step and failed to stand a qualification test. The mixture was admixed with 1 percent of sodium hydroxide and subjected to the second batchwise distillation. The second distillation was carried out at a temperature of 160°C at a reflux ratio of 3 to 6 at a distillation ratio of about 90, using a packed tower type distillator having 6 theory stages. The distilled ε-caprolactam monomer had a PM value of 3,600 seconds or more and an acid value of 0.002 or less. This grade of the ε-caprolactam is suitable for producing an ε-caprolactam polymer usable for fiber making. Thereafter, the distillation residue in an amount of about 10 percent based on the original weight of the ε-caprolactam mixture was mixed with the same fresh crude ε-caprolactam monomer and the same unqualified fraction of the distilled ε-caprolactam monomer as those stated above and, then, subjected to the same extraction and distillation as stated above. Such extraction and distillation were successively repeated four times more.

In Example 20, the same procedures were repeated using an aqueous solution containing 40% of disodium hydrogen phosphate and having a pH of 95.

In Example 21, the same procedures as in Example 19 were repeated using an aqueous solution of a pH of 7.3 containing 40 percent of a mixture consisting of one part by mole of sodium dihydrogen phosphate and one part by mole of disodium hydrogen phosphate.

In Examples 22 and 23, the same procedures as in Example 19 were repeated respectively using an aqueous solution of a pH of 9.6 containing 40 percent of dipotassium hydrogen phosphate and an aqueous solution of a pH of 40 containing 30 percent of lithium dihydrogen phosphate.

In Comparison Example 10, the same distillation procedures as in Example 19 were applied to the same distillation residue as in Example 19 without the extraction operation for alkali metal ion.

The distillation procedures in Examples 19 through 23 were smoothly carried out throughout five batches without difficulty.

Compared with this, in Comparison Example 10, the second distillation for the first distillation residue could be carried out up to the distillation ratio of 45 percent, but the third distillation could not carry out because of low fluidity of the charge in the distillater.

Table 6

| Example No. | Phosphate aqueous solution | | Content of phosphates and manganese in isolated ε-caprolactam mixture | | | Average distillation ratio (%) | Yield of[*2] purified ε-caprolactam (%) |
|---|---|---|---|---|---|---|---|
| | Phosphate | Concentration (%) | $MH_2PO_4$ (%) | $M_2HPO_4$ (%) | Manganese (p.p.m.) | | |
| 19 | $NaH_2PO_4$ | 50 | 0.15 | $H_3PO_4$ 0.07 | 3 | 89 | 89 |
| 20 | $Na_2HPO_4$ | 40 | 0 | 0.30 | 15 | 89 | 88 |
| 21 | $NaH_2PO_4$ & $Na_2HPO_4$ (1:1) | 40 | 0.05 | 0.09 | 4 | 91 | 92 |
| 22 | $K_2HPO_4$ | 40 | 0 | 0.34 | 19 | 88 | 86 |
| 23 | $LiH_2PO_4$ | 30 | 0.18 | $H_3PO_4$ 0.08 | 4 | 87 | 86 |

Table 6-continued

| Example No. | Phosphate aqueous solution Phosphate | Concentration (%) | Content of phosphates and manganese in isolated ε-caprolactam mixture MH₂PO₄ (%) | M₂HPO₄ (%) | Manganese (p.p.m.) | Average distillation ratio (%) | Yield of*² purified ε-caprolactam (%) |
|---|---|---|---|---|---|---|---|
| Comparison Example 10 | — | — | — | | | 45*¹ | 63*³ |

Note:
*¹distillation ratio in the second distillation
*²a ratio of the total weight of the purified ε-caprolactam obtained in 6 distillations to the total weight of the crude ε-caprolactam used in 6 distillations
*³a total yield in the first and second distillations

EXAMPLES 24 THROUGH 28 AND COMPARISON EXAMPLES 11 THROUGH 15

In Example 24, the last distillation residues in Examples 19 through 23 were incorporated to prepare a mixture. The distillation residue mixture was an ε-caprolactam mixture consisting of 9 percent of sodium ion calculated in terms of sodium hydroxide, 70 p.p.m. of manganese, 13 percent by weight of ε-caprolactam oligomer, 14 percent of 68-aminocaproic acid and the balance mainly consisting of ε-caprolactam monomer. The ε-caprolactam mixture was charged into a settler with a stirrer receiving an aqueous solution containing 20 percent of a mixture of 8 parts by mole of sodium dihydrogen phosphate and 2 parts by mole of disodium hydrogen phosphate in an amount of five times that of the ε-caprolactam mixture, stirred at a temperature of 70°C for 20 minutes and, then, settled for 40 minutes to extract the alkali metal ions from the ε-caprolactam mixture. The ε-caprolactam mixture phase was separated from the phosphate aqueous solution.

The purified ε-caprolactam mixture was burnt in an experimentary combustion furnace with a fluidized bed at a temperature of approximately 800°C.

In examples 25 through 28, the same procedures as in Example 24 were repeated using the aqueous solutions containing respectively 30, 40, 60 and 70 percent of the same phosphate mixture as in Example 24.

In examples 24 through 28, the combustions of the isolated ε-caprolactam mixture were smoothly carried out without blocking of the fluidized bed with dust material.

In Comparison Examples 11 through 14, the same operations as in Example 24 were repeated using, instead of the phosphate aqueous solutions used in Examples 24 through 28, aqueous solutions respectively containing 12 percent (Comparison Example 11) and 80 percent (Comparison Example 12) of the same phosphate mixture as used in Example 24, 30 percent of sodium chloride (Comparison Example 13) and 20 percent of sodium sulfate (Comparison Example 14).

In the extraction step in Comparison Example 11, a portion of the ε-caprolactam monomer in the original distillation residue mixture was dissolved into the phosphate aqueous solution. As a result of the dissolution, the content of the ε-caprolactam monomer in the purified ε-caprolactam mixture was about one quarter the content in the original distillation residue mixture. The purified ε-caprolactam mixture was not subjected to the combustion test.

In the combustion step in Comparison Example 12, the bed material in the furnace was blocked with dust material 40 hours after starting the combustion.

In the combustion step in Comparison Example 13, the bed material was blocked 8 hours after starting the combustion.

In the combustion step of Comparison Example 14, the bed material was blocked 9 hours after the beginning of the combustion.

In Comparison Example 15, , the distillation residue mixture containing 9 percent of sodium hydroxide was directly burnt in the same type of the combustion furnace as used in Example 24. The bed material was blocked 2 hours after the beginning of the combustion.

The contents of sodium ion calculated in terms of phosphate, chloride, sulfate and other compounds and manganese in the isolated ε-caprolactam mixture are shown in Table 7.

Table 7

| Example No. | | Salt aqueous solution Salt | Concentration (%) | Content of sodium ion and manganese in purified ε-caprolactam mixture (%) NaH₂PO₄ | Na₂HPO₄ | NaCl | Na₂SO₄ | NaOH | Manganese (ppm) |
|---|---|---|---|---|---|---|---|---|---|
| Comparison Example 11 | | Phosphate mixture | 12 | 1.3 | 0.60 | — | — | — | 10 |
| 24 | | " | 20 | 0.25 | 0.08 | — | — | — | 5 |
| 25 | | " | 30 | 0.17 | 0.04 | — | — | — | 3 |
| 26 | | " | 40 | 0.16 | 0.04 | — | — | — | 3 |
| 27 | | " | 60 | 0.20 | 0.04 | — | — | — | 2 |
| 28 | | " | 70 | 0.30 | 0.08 | — | — | — | 4 |
| Comparison | 12 | " | 80 | 2.3 | 0.30 | — | — | — | 18 |
| Example | 13 | NaCl | | — | — | 0.16 | 3.0 | 30 | |
| | 14 | NaSO₄ | 20 | — | — | — | 0.26 | 2.3 | 30 |
| | 15 | — | — | — | — | — | — | 9.0 | 70 |

EXAMPLE 29 and Comparison Example 16

Three parts of a crude ε-caprolactam which had been distilled together with water from a system for polymerizing ε-caprolactam in the presence of water as a catalyst, was mixed with one part of a mixture of ε-caprolactam monomer and oligomer which had been obtained by washing, with water, the poly-ε-caprolactam prepared in the above polymerization system. The mixture thus prepared was further admixed with 0.6 percent of sodium hydroxide and, then, subjected to a distillation to recover purified ε-caprolactam monomer. The distillation residue was an ε-caprolactam mixture consisting of 30 percent of ε-caprolactam oligomer, 4.0 percent sodium ion calculated in terms of sodium hydroxide and the balance mainly consisting of ε-caprolactam monomer. One part of the distillation residue was charged into a settler with an agitator receiving one part of an aqueous solution containing 50 percent of a mixture of 4 parts by mole of sodium dihydrogen phosphate and 6 parts of disodium hydrogen phosphate. The mixture in the settler was stirred at a temperature of 140°C under a gauge pressure of about 3 kg/cm$^2$ for 10 minutes and, thereafter, settled for 30 minutes to separate the ε-caprolactam mixture from the phosphate aqueous solution.

The purified ε-caprolactam mixture was admixed with waste poly-ε-caprolactam in an amount 3 times the isolated ε-caprolactam mixture. The mixture was subjected to batchwise depolymerizations repeated five times. In the first depolymerization, the content of phosphoric acid as a depolymerization catalyst was about 6 percent. Each depolymerization was effected at a temperature of 250°C while supplying superheated steam into the depolymerization system under a normal pressure with a depolymerization ratio of about 80 percent. The crude ε-caprolactam monomer thus obtained was fed into a packed tower type distillater having 6 theoretical stages from which a purified ε-caprolactam monomer was obtained. The reaction residue in an amount of about 20 percent based on the original amount of the ε-caprolactam material mixture fed into the depolymerization, was mixed with the same waste poly-ε-caprolactam used in the above in the same manner as above. The mixture was subjected to the same depolymerization and distillation as detailed above. These procedures were repeated three times more without difficulty. The distilled ε-caprolactam monomer had a PM value of 3,600 seconds or more and an acid value of 0.002 or less and was suitable for producing poly-ε-caprolactam usable for fiber makingg. As a result of the repeated depolymerizations and distillations, the purified ε-caprolactam monomer was obtained in a yield of 88 percent.

In Comparison Example 16, the same distillation residue containing 4.0 percent of sodium hydroxide as used in Example 29 was directly mixed with the same waste poly-ε-caprolactam as used in Example 29. The mixture was subjected to the same depolymerizations and distillations as in Example 29. In third and fourth batches of the depolymerization, the fluidity of the charge was undesirably decreased. In fifth batch depolymerization was impossible because of very low fluidity of the charge. The total yield of the purified ε-caprolactam monomer in first through fourth batches was 73 percent.

The contents of the phosphates in the isolated ε-caprolactam material mixture in Example 8 are shown in Table 8.

Table 8

| Example No. | Content of sodium ion in ε-caprolactam mixture (%) | | | Yield of purified ε-caprolactam monomer (%) |
|---|---|---|---|---|
| | NaH$_2$PO$_4$ | Na$_2$HPO$_4$ | NaOH | |
| 29 | 0.08 | 0.09 | — | 88*$^1$ |
| Comparison Example 16 | — | — | 4.0 | 73*$^2$ |

Note:
*$^1$Total yield in batches 1 through 5.
*$^2$Total yield in batches 1 through 4.

EXAMPLES 30 and 31 and Comparison Example 17

In Example 30, a mixture of 700 parts of waste poly-ε-caprolactam and 300 parts of ε-caprolactam oligomer containing 0.5 percent of sodium ion calculated in terms of sodium hydroxide, was continuously depolymerized in the presence of phosphoric acid catalyst to recover the resultant ε-caprolactam monomer. 50 parts of reaction residue were obtained. The reaction residue was an ε-caprolactam material mixture consisting 7 parts of phosphoric acid, 6 parts of sodium dihydrogen phosphate, 3 parts of titanium dioxide pigment, 510 ppm of manganese of the balance mainly consisted of ε-caprolactam monomer, oligomer and polymer and a brown resinous substance which was a by-product of the depolymerization. One part of this reaction residue was mixed with 2 parts of aqueous solution containing 50 percent of disodium hydrogen phosphate and charged into a settler with a stirrer to remove phosphoric acid and sodium ions and manganese. The mixture was stirred at a temperature of 200°C under a gauge pressure of about 1.4 kg/cm$^2$ for 10 minutes and, then, settled for 30 minutes. Thereafter, the purified ε-caprolactam material mixture was burnt in a combustion furnace having a fluidized bed consisting of sand.

In Example 31, the same operations as in Example 30 were repeated using an aqueous solution containing 40 percent of trisodium phosphate in an amount three times the amount of the distillation residue.

The purified ε-caprolactam material mixtures in Examples 30 and 31 contained ash, phosphates, phosphoric acid and manganese in amounts as shown in Table 9, and smoothly burnt without blocking the combustion bed. The combustion residue ashes collected into a cyclone contained non-burnt combustible substance in amounts shown in Table 9.

In Comparison Example 17, the same reaction residue as in Example 30 was directly burnt in the same manner as in Example 30. 2 hours later, the bed material consisting of sand was sintered. The combustion residue ashes contained 80% of non-burnt combustible substance in the form of dust.

Examples 30 and 31 and Comparison Example 17 are summarized in Table 9.

Table 9

| | | Example 30 | Example 31 | Comparison Example 17 |
|---|---|---|---|---|
| Extraction | Salt | Na$_2$HPO$_4$ | Na$_3$PO$_4$ | — |
| | Concentration | 50 | 40 | — |
| | Ratio of distillation residue weight to phosphate solution weight | 1/2 | 1/3 | — |
| Content in purified ε-caprolactam mixture (%) | Ash | 2.1 | 3.3 | — |
| | NaH$_2$PO$_4$ | 0.04 | 0.21 | — |
| | NaHPO$_4$ | 0.09 | 0.34 | — |
| | H$_3$P$_4$ | 0 | 0 | — |
| | Manganese (ppm) | 2 | 15 | — |
| | Blocking of bed material | none | none | blocked 2 |
| Combustion | Content (%) of non-burnt combustible material in combustion residue ashes | 3 | 10 | 80 |

EXAMPLES 32 through 34 and Comparison Example 18

In Example 32, 1000 parts of an ε-caprolactam material mixture consisting of 20 percent of an ε-caprolactam monomer, 2.0 percent of sodium ion calculated in terms of sodium hydroxide and the balance mainly consisting of an ε-caprolactam oligomer was depolymerized batchwise in the presence of phosphoric acid catalyst, while distillating out the resultant ε-caprolactam monomer. 250 parts of reaction residue were obtained. The reaction residue contained 32 parts of phosphoric acid and 60 parts of sodium dihydrogen phosphate. A large amount of the phosphate was generally not dissolved in the depolymerization mixture and this resulted in an undesirable decrease in fluidity of the depolymerization mixture.

250 parts of the reaction residue were mixed with 750 parts of the same fresh ε-caprolactam material mixture as used above. After the content of free phosphoric acid in the mixture was adjusted to 31 parts, the mixture was subjected to the depolymerization in the same manner as stated above. When the reaction residue reached the amount of 450 parts, the fluidity of the depolymerization mixture, that is, the reaction residue became insufficient. The reaction residue contained 31 parts of phosphoric acid and 105 parts of sodium dihydrogen phosphate. This reaction residue was discharged from the depolymerization vessel and mixed with 200 parts of a distillation residue consisting of 10 percent of an ε-caprolactam oligomer and 90 percent of an ε-caprolactam monomer which had been obtained from a distillation process of a crude ε-caprolactam. The ε-caprolactam material mixture thus prepared was mixed with an aqueous solution containing 35 percent of a mixture of sodium dihydrogen phosphate and disodium hydrogen phosphate in the same amount by mole and charged into a settler with a stirrer, to remove phosphoric acid and phosphates from the ε-caprolactam material mixture. The ratio by weight of the ε-caprolactam material mixture to the phosphate solution was 1 : 1.5. The mixture was stirred at a temperature of 106°C under a normal pressure for 20 minutes and, settled for 40 minutes, and, thereafter, the ε-caprolactam mixture was separated from the phosphate solution. The purified ε-caprolactam material mixture was mixed with 500 parts of the same fresh ε-caprolactam material mixture as used first, and phosphoric acid in an initial concentration of 3 percent and the mixture was smoothly depolymerized without difficulty while distilling out the resultant ε-caprolactam monomer. The depolymerization was effected at a temperature of 260°C by feeding superheated steam into the depolymerization mixture.

By the three depolymerizations stated above, the crude ε-caprolactam monomer was recovered in a yield of 95 percent. The crude ε-caprolactam monomer was purified into a pure grade suitable for fiber making in a yield of 92 percent by way of distillation.

In Example 33, the same procedures as in Example 32 were repeated using an aqueous solution containing 35 percent of sodium dihydrogen phosphate in a weight of four times the ε-caprolactam mixture.

In Example 34, the same operations as in Example 32 were repeated using an aqueous solution containing 35 percent of disodium hydrogen phosphate in a weight equal to that of the ε-caprolactam mixture.

In Comparison Example 18, the same operations as in Example 32 were repeated except that the second depolymerization and distillation were carried out until the reaction residue became an amount of 350 parts in spite of a remarkable decrease in the fluidity of the reaction residue and the fact that the extraction process for the ε-caprolactam mixture was omitted. In the comparison example, the crude ε-caprolactam monomer was obtained in a yield of 87 percent. However, the crude ε-caprolactam thus obtained noticeably colored brown. Further, the upper portion of the inside wall and distillation exit of the depolymerizing vessel were stained with a large amount of an adhesive brown substance having a low fluidity.

In Examples 32 through 34, the purified ε-caprolactam monomer had a PM value of 3,600 seconds, or more and an acid value of 0.002 or less, and was pertinent for producing poly-ε-caprolactam usable for fiber making.

The results of Examples 32 through 34 and Comparison Example 18 are summarized in Table 10. From this table, it is obvious that the yields of the crude and purified ε-caprolactam in Examples 32 through 34 are higher than those in Comparison Example 18.

Table 10

|  |  | Example 32 | Example 33 | Example 34 | Comparison Example 18 |
|---|---|---|---|---|---|
| Extraction | Salt | $NaH_2PO_4$ and $Na_2HPO_4$ | $NaH_2PO_4$ | $Na_2HPO_4$ | — |
|  | Ratio of ε-caprolactam mixture weight to phosphate solution weight | 1/1.5 | 1/4 | 1/1 | — |
| Content in purified ε-caprolactam mixture (%) | $H_2PO_4$ | 0 | 0.18 | 0 | — |
|  | $NaH_2PO_4$ | 0.12 | 0.15 | 0.08 | — |
|  | $Na_2HPO_4$ | 0.04 | 0 | 0.12 | — |
| Yield of crude ε-caprolactam (%) |  | 95 | 94 | 92 | 87 |
| Yield of purified ε-caprolactam (%) |  | 92 | 91 | 88 | 82 |

EXAMPLES 35 through 41 and Comparison Examples 19 and 20

In Example 35, 1,000 parts of waste poly-$\epsilon$-caprolactam was depolymerized in the presence of phosphoric acid catalyst while distilling out the resultant $\epsilon$-caprolactam monomer. 60 parts of reaction residue were collected, wherein 15 parts of phosphoric acid and 800 ppm of manganese were contained and a brown resinous substance deposited. The reaction residue was mixed with an aqueous solution of a pH of 8.0 containing 15 percent of a mixture of 3 parts by mole of disodium hydrogen phosphate and 2 parts by mole of sodium dihydrogen phosphate in an amount of seven times the weight of the reaction residue. The mixture was stirred at a temperature of 190°C for 15 minutes to extract phosphoric acid and phosphates from the reaction residue to the phosphate aqueous solution, and the $\epsilon$-caprolactam material mixture was separated from the phosphate aqueous solution using a centrifugal separator at a centrifugal effect of 150 G for 5 minutes. The purified $\epsilon$-caprolactam material mixture was burnt in a combustion furnace without blocking of the bed material.

In Examples 36 through 41, the same procedures as in Example 35 were repeated using aqueous solutions respectively containing 20, 30, 40, 50, 60 and 70 percent of the same phosphate mixture as in Example 35. In every example, the combustion of the isolated $\epsilon$-caprolactam material mixture was smoothly carried out without blocking of the bed material.

In Comparison Examples 19 and 20, the same procedures as in Example 35 were repeated using aqueous solutions respectively containing 10 and 80 percent of the same phosphate mixture as used in Example 35. In Comparison Example 19, the bed material composed of sand in the combustion furnace was blocked 10 hours after the beginning of the combustion. In Comparison Example 20, the bed material composed of sand was blocked 20 hours after the beginning of the combustion.

The contents of impurities in the isolated $\epsilon$-caprolactam material mixtures in these examples and comparison examples are shown in Table 11.

EXAMPLES 42 THROUGH 44 AND COMPARISON EXAMPLE 21

In Example 42, 3,000 parts of waste $\epsilon$-caprolactam polymer were continuously depolymerized in the presence of phosphoric acid catalyst, and 100 parts of reaction residue were collected. This reaction residue contained 1 part of phosphoric acid and a small amount of brown resinous substance. In order to remove phosphoric acid and phosphates, the reaction residue in an amount of 3 parts was mixed with 2 parts of an aqueous solution of a pH of 7.3 containing 30 percent of a mixture of lithium dihydrogen phosphate and dilithium hydrogen phosphate in the same amount by mole. The mixture was stirred at a temperature of 230°C for 10 minutes in a settler with a stirrer and then settled for 40 minutes and, thereafter, the $\epsilon$-caprolactam material mixture was separated from the phosphate aqueous solution. The purified $\epsilon$-caprolactam material mixture was burnt in a combustion furnace with a fluidized bed. The combustion was smoothly carried out over 48 hours without blocking of the bed.

In Examples 43 and 44, the same operations as in Example 42 were carried out using aqueous solutions respectively containing 40 percent of a mixture of sodium dihydrogen phosphate and disodium hydrogen phosphate in the same amount by mole (Example 43) and 40 percent of a mixture of potassium dihydrogen phosphate and dipotassium hydrogen phosphate in the same amount by mole (Example 44).

In these examples, the combustions were smoothly effected over 48 hours without difficulty.

In Comparison Example 21, the same reaction residue as in Example 42 was directly burnt in the same type of the combustion furnace as used in Example 42. 10 hours later, the bed composed of sand was blocked.

The contents of impurities in the $\epsilon$-caprolactam mixture subjected to combustion are shown in Table 12.

Table 12

| Type of phosphate | | Example 42 lithium salt (30%) | Example 43 sodium salt (40%) | Example 44 potassium salt (40%) | Comparison Example 21 |
|---|---|---|---|---|---|
| Content of impurities in $\epsilon$-caprolactam mixture (%) | $H_3PO_4$ | 0.02 | 0 | 0 | 1.0 |
| | $MH_2PO_4$ | 0.15 | 0.10 | 0.14 | — |
| | $M_2HPO_4$ | 0 | 0.04 | 0.06 | — |

EXAMPLE 45 AND COMPARISON EXAMPLE 22

In Example 45, a poly-$\epsilon$-caprolactam containing small amounts of manganese pyrophosphate and copper phosphate was depolymerized in the presence of a catalyst mixture composed of 2 parts of sodium hydrox- Table 11

| Example No. | Concentration of phosphates in aqueous solution (%) | Content of impurities in purified $\epsilon$-caprolactam mixture (%) | | | |
|---|---|---|---|---|---|
| | | Manganese (ppm) | $H_3PO_4$ | $NaH_2PO_4$ | $Na_2HPO_4$ |
| Comparison Example 19 | 10 | 22 | 0.70 | 0.32 | 0 |
| 35 | 15 | 13 | 0.11 | 0.10 | 0 |
| 36 | 20 | 6 | 0.05 | 0.07 | 0 |
| 37 | 30 | 2 | 0.01 | 0.05 | 0 |
| 38 | 40 | 2 | 0 | 0.07 | 0.02 |
| 39 | 50 | 1 | 0 | 0.07 | 0.02 |
| 40 | 60 | 2 | 0 | 0.09 | 0.03 |
| 41 | 70 | 5 | 0 | 0.20 | 0.15 |
| Comparison Example 20 | 80 | 28 | 0 | 0.85 | 0.60 | ide and 1 part of potassium hydroxide while distilling the resultant ε-caprolactam monomer. The reaction residue which has been collected from the above process, was an ε-caprolactam material mixture containing 250 ppm of manganese, 60 ppm of copper and 25 percent of alkali metal ions in the term of sodium hydroxide.

In order to eliminate metal ions, the reaction residue was mixed with an aqueous solution of a pH of 7.4 containing 50 percent of a mixture of potassium dihydrogen phosphate and disodium hydrogen phosphate in the same quantities in an amount of five times the weight of the reaction residue, and the mixture was charged into a settler with a stirrer. The mixture was stirred at a temperature of 230°C under a gauge pressure of 24 kg/cm² for 10 minutes and, settled for 20 minutes and, thereafter, the ε-caprolactam material mixture was separated from the phosphate aqueous solution. The purified ε-caprolactam material mixture contained impurities in the contents as shown in Table 13. The ε-caprolactam material mixture thus isolated was burnt at a temperature of about 800°C in an experimental combustion furnace having a fluidized bed. This combustion was smoothly continued over 48 hours without difficulty.

In Comparison Example 22, the same reaction residue as used in Example 45 was directly burnt in the same manner as in Example 45, without the removal of the metal ions.

In the combustion, one hour after beginning of the combustion, the bed began blocking and 2 hours after the start, it was impossible to continue the combustion due to the firm blocking of the bed.

Table 13

|  |  | Example 45 |
|---|---|---|
| Content of impurities in isolated ε-caprolactam mixture (%) | MH₂PO₄ | 0.10 |
|  | M₂HPO₄ | 0.03 |
|  | Manganese | 3 ppm |
|  | Copper | 2 ppm |

EXAMPLE 46

A mixture of ε-caprolactam monomer and oligomer was extracted from a polymerized ε-caprolactam with water. The mixture was distilled in the presence of sodium hydroxide to recover the ε-caprolactam monomer. The distillation residue collected from the above distillation was an ε-caprolactam material mixture consisting of 1.0 percent of sodium ion calculated in terms of sodium hydroxide, about 20 percent of an ε-caprolactam monomer and the balance mainly consisting of an ε-caprolactam oligomer. This residue which is referred to hereinafter as "single distillation residue," was mixed with an aqueous solution of 45 percent of a mixture of 2 parts by mole of disodium hydrogen phosphate and 3 parts by mole of sodium dihydrogen phosphate in an amount the same as the weight of the distillation residue. The mixture was charged into a settler with a stirrer, stirred at a temperature of 180°C for 15 minutes, and settled for 30 minutes, and the ε-caprolactam material mixture was separated from the phosphate aqueous solution. This extraction is referred to hereinafter as "first extraction."

The isolated ε-caprolactam material mixture was continuously depolymerized in the presence of 25 percent of phosphoric acid catalyst at a temperature of 240°C under a pressure of 0.5 absolute atmospheres while distilling out the resultant ε-caprolactam monomer by blowing superheated steam into the ε-caprolactam mixture. As a result of these operations, 100 parts of reaction residue was obtained from 1,700 parts of the isolated ε-caprolactam material mixture.

In order to purify the resultant crude ε-caprolactam monomer, 0.2 percent of sodium hydroxide was mixed with the crude ε-caprolactam monomer and the mixture was distilled at a temperature of 160°C using a packed tower type distillator having six theoretical stages. About 3 percent of the distillation residue based on the original weight of the crude ε-caprolactam monomer were collected. The reaction residue in the depolymerization process was admixed with the distillation residue in the refining distillation process. This mixture is referred to as "process residue admixture." The major parts of the phosphate aqueous solution recovered from the first extraction process was reused to extract the phosphoric acid and alkali metal ions from the process residue admixture. This extraction is referred to hereinafter as "second extraction." The second extraction was carried out in the similar manner to the first extraction, and an ε-caprolactam material mixture was separated from the phosphate aqueous solution and, thereafter, burnt without difficulty.

The same operations as detailed above were repeated nine times more. Throughout these times, a phosphate aqueous solution was repeatedly used for the first and second extractions in the same manner as stated above. In the start of each of these times, the concentration of the phosphate aqueous solution is regulated by adding a necessary amount of phosphoric acid or water.

By these ten treatments, the crude ε-caprolactam monomer was obtained in a yield of 95 percent based on the total weight of the single distillation residues and the purified ε-caprolactam monomer in a yield of 89 percent.

The first extracted ε-caprolactam material mixtures contained an average of 0.10 percent of sodium dihydrogen phosphate and 0.08 percent of disodium hydrogen phosphate. Also, the second extracted ε-caprolactam material mixture contained an average of 0.14 percent of sodium dihydrogen phosphate and 0.05 percent of disodium hydrogen phosphate.

Through these ten treatments, 41 parts of phosphoric acid with respect to 17,000 parts of the single distillation residue were consumed for the first and second extractions. Also, 400 parts of phosphate mixture consisting of disodium hydrogen phosphate and sodium dihydrogen phosphate in an average ratio by mole of 7 : 1, were recovered from the ten treatments.

Compared with this, provided the first and second extractions are each carried out using a fresh phosphate aqueous solution which is the same as in the present invention, 243 parts of phosphoric acid and 143 parts of sodium hydroxide with respect to 17,000 parts of the single distillation residue will be consumed.

EXAMPLES 47 THROUGH 54

A poly-ε-caprolactam was depolymerized in the presence of phosphoric acid while distilling out the resultant ε-caprolactam monomer. The reaction residue was an ε-caprolactam material mixture containing 5 percent of phosphoric acid and a noticeable amount of a brown resinous substance. The distillation residue was divided into eight fractions.

In Example 47, one fraction of the reaction residue was mixed with an aqueous solution of a pH of 4.0 containing 40 percent of sodium dihydrogen phosphate in amount of 2.5 times the weight of the fraction. The mixture was charged into a settler with stirrer, stirred at a temperature of 200°C for 20 minutes, and settled for 40 minutes and, thereafter, the ε-caprolactam material mixture phase was separated from the phosphate aqueous solution.

In Examples 48 through 54, the same procedures as in Example 47 were repeated respectively using phosphate aqueous solutions of a pH as shown in Table 14. The contents of impurities in the isolated ε-caprolactam mixtures in Examples 47 through 54 are shown in Table 14.

Table 14

| Example No. | Phosphate solution Composition | pH | Content of impurities in purified ε-caprolactam mixture (%) | | | |
|---|---|---|---|---|---|---|
| | | | $H_3PO_4$ | $NaH_2PO_4$ | $Na_2HPO_4$ | $Na_3PO_4$ |
| 47 | $NaH_2PO_4$ | 4.0 | 0.25 | 0.20 | 0.00 | 0.00 |
| 48 | $NaH_2PO_4/Na_2HPO_4$ (9:1 by mole) | 4.6 | 0.15 | 0.14 | 0.00 | 0.00 |
| 49 | $NaH_2PO_4/Na_2HPO_4$ (4:6 by mole) | 7.2 | 0.00 | 0.11 | 0.07 | 0.00 |
| 50 | $Na_2HPO_4$ | 8.2 | 0.00 | 0.04 | 0.15 | 0.00 |
| 51 | $Na_2HPO_4/Na_3PO_4$ (9:1 by mole) | 9.6 | 0.00 | 0.03 | 0.25 | 0.00 |
| 52 | $Na_2HPO_4/Na_3PO_4$ (8:2 by mole) | 10.2 | 0.00 | 0.00 | 0.25 | 0.05 |
| 53 | $Na_2HPO_4/Na_3PO_4$ (4:6 by mole) | 11.0 | 0.00 | 0.00 | 0.17 | 0.13 |
| 54 | $Na_3PO_4$ | 12.1 | 0.00 | 0.00 | 0.06 | 0.30 |

Table 14 shows that the total content of the phosphoric acid and phosphates is relatively small in Examples 49 and 50 wherein the pH of the phosphate aqueous solutions are in a range of from 5 to 9. However, all of the purified ε-caprolactam mixtures in Examples 47 through 54 were smoothly burnt over 48 hours without difficulty.

What we claim is:

1. A method for purifying an ε-caprolactam material comprising the steps of:
   bringing an ε-caprolactam material selected from the group consisting of a monomer, oligomers, and polymers of ε-caprolactam and mixtures of two or more of the above-mentioned compounds and containing at least one impurity compound selected from the group consisting of phosphoric acid and ionized metal compounds, at a temperature of at least 60°C, into contact with an aqueous solution containing 15 to 75 percent by weight of at least one alkali metal phosphate to extract said impurity compound from said ε-caprolactam material into said alkali metal phosphate aqueous solution, and
   separating said ε-caprolactam material phase from said alkali metal phosphate aqueous solution phase.

2. A method as claimed in claim 1, wherein said alkali metal phosphate aqueous solution is in a concentration of 30 to 60 percent by weight.

3. A method as claimed in claim 1, wherein said alkali metal phosphate is selected from the group consisting of monoalkali metal dihydrogen phosphates, dialkali metal monohydrogen phosphates, trialkali metal phosphates and mixtures of two or more of the above-mentioned phosphates.

4. A method as claimed in claim 1, wherein said ε-caprolactam material is selected from the group consisting of:
   a. concentrated products or distillation residues of aqueous solutions containing an ε-caprolactam monomer or oligomer or a mixtures of the monomer and the oligomer produced by washing a ε-caprolactam polymer with water,
   b. distillation residues of aqueous solutions containing an ε-caprolactam monomer, obtained from processes for polymerizing an ε-caprolactam monomer in the presence of water as a catalyst, wherein a portion of the ε-caprolactam monomer is evaporated together with the water,
   c. reaction residues produced in processes for depolymerizing an ε-caprolactam polymer or oligomer or a mixture of the polymer and oligomer in the presence of phosphoric acid as a catalyst,
   d. distillation residues produced in processes for refining a crude ε-caprolactam monomer which has been produced by depolymerizing an ε-caprolactam polymer or oligomer or a mixture of the polymer and oligomer in the presence of phosphoric acid as a catalyst,
   e. distillation residues produced in processes wherein a crude ε-caprolactam monomer is produced by the Beckman rearrangement reaction of cyclohexanone oxime and the resultant crude ε-caprolactam is distilled in the presence of an alkaline alkali metal compound
   f. reaction residues produced in processes for depolymerizing an ε-caprolactam polymer or oligomer or a mixture of the polymer and oligomer in the presence of an alkali metal compound as catalyst and
   g. mixtures of two or more of the ε-caprolactam materials as stated above.

5. A method as claimed in claim 1, wherein said contact is effected at a temperature of 60° to 300°C.

6. A method as claimed in claim 5, wherein said contact temperature is from 100° to 250°C.

7. A method as claimed in claim 1, wherein a ratio by weight of said ε-caprolactam material to said alkali metal phosphate aqueous solution is 1 : 10 to 2 : 1.

8. A method as claimed in claim 1, wherein said alkali metal phosphate aqueous solution is in a pH of 4 to 12.5.

9. A method as claimed in claim 8, wherein said pH of said alkali metal phosphate aqueous solution is from 5 to 9.

10. A method as claimed in claim 1, wherein an ε-caprolactam material containing alkali metal ions and another ε-caprolactam material containing phosphoric acid are simultaneously brought into contact with a common said alkali metal phosphate aqueous solution.

11. A method as claimed in claim 1, wherein an ε-caprolactam material containing alkali metal ions and an impure ε-caprolactam material containing phosphoric acid are separately brought into contact with a common said alkali metal phosphate aqueous solution.

12. A method as claimed in claim 1, wherein said purified ε-caprolactam material is destroyed in a fluidized bed combustion furnace.

13. A method as claimed in claim 1, wherein said purified ε-caprolactam polymer or oligomer is subjected to depolymerization to recover the ε-caprolactam monomer.

14. A method as claimed in claim 1, wherein said purified ε-caprolactam is further purified by way of distillation.

15. A method as claimed in claim 1, wherein said ionized metal compounds are ionized alkali metal compounds.

16. A method as claimed in claim 1, wherein said separating is carried out by settling the mixture of said ε-caprolactam material and said alkali metal phosphate aqueous solution.

17. A method as claimed in claim 1, wherein said separating is carried out by centrifuging the mixture of said ε-caprolactam material and said alkali metal phosphate aqueous solution.

* * * * *

UNITED STATES PATENT OFFICE
CERTIFICATE OF CORRECTION

Patent No. 3,925,365   Dated December 9, 1975

Inventor(s) Nobuo Izawa and Toshihiko Kohno

It is certified that error appears in the above-identified patent and that said Letters Patent are hereby corrected as shown below:

In Table 7, on the eighth line in the next to the last column, delete "30" and insert therefor --3.0--

In Table 7, on the eighth line in the last column, insert --30--

In Table 9, in the last column, after "blocked 2" insert --hrs. later--

Signed and Sealed this sixteenth Day of March 1976

[SEAL]

Attest:

RUTH C. MASON
Attesting Officer

C. MARSHALL DANN
Commissioner of Patents and Trademarks